(12) United States Patent
Fang et al.

(10) Patent No.: US 8,819,388 B2
(45) Date of Patent: *Aug. 26, 2014

(54) CONTROL OF ON-DIE SYSTEM FABRIC BLOCKS

(75) Inventors: Zhen Fang, Portland, OR (US); Mahesh Wagh, Portland, OR (US); Jasmin Ajanovic, Portland, OR (US); Michael E. Espig, Newberg, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,966

(22) Filed: Jul. 17, 2012

(65) Prior Publication Data

US 2012/0284486 A1    Nov. 8, 2012

Related U.S. Application Data

(63) Continuation of application No. 12/415,941, filed on Mar. 31, 2009, now Pat. No. 8,225,069.

(51) Int. Cl.
*G06F 12/00* (2006.01)
*G06F 12/10* (2006.01)

(52) U.S. Cl.
CPC .......... *G06F 12/109* (2013.01); *G06F 12/1027* (2013.01)
USPC ............................. 711/203; 711/206; 711/202

(58) Field of Classification Search
CPC .......................... G06F 12/109; G06F 12/1027
See application file for complete search history.

(56) References Cited

U.S. PATENT DOCUMENTS

| 5,748,539 | A | * | 5/1998 | Sproull et al. | ........... 365/189.04 |
| 6,009,488 | A | | 12/1999 | Kaviprapu | |
| 7,058,726 | B1 | | 6/2006 | Osaku et al. | |
| 7,299,337 | B2 | * | 11/2007 | Traut et al. | .................... 711/206 |
| 7,310,721 | B2 | | 12/2007 | Cohen | |
| 7,334,076 | B2 | | 2/2008 | Hendel et al. | |
| 7,930,530 | B2 | | 4/2011 | Roh et al. | |
| 2005/0091432 | A1 | | 4/2005 | Adams et al. | |
| 2006/0259732 | A1 | | 11/2006 | Traut et al. | |
| 2008/0215848 | A1 | | 9/2008 | Sheu et al. | |
| 2009/0240876 | A1 | | 9/2009 | Okuno et al. | |
| 2009/0282226 | A1 | * | 11/2009 | Hoover et al. | ................ 712/225 |
| 2011/0167253 | A1 | | 7/2011 | Roh et al. | |

FOREIGN PATENT DOCUMENTS

| EP | 1145122 B1 | 4/2007 |
| GB | 2424294 A | 9/2006 |
| JP | 10312338 A | 11/1998 |
| JP | 2006-127407 A | 5/2006 |

(Continued)

OTHER PUBLICATIONS

Office Action received for Japanese Patent Application No. 2012-500824, mailed on Jun. 11, 2013, 3 pages of English Translation and 3 pages of Office Action.

(Continued)

*Primary Examiner* — Baboucarr Faal
(74) *Attorney, Agent, or Firm* — Caven & Aghevli LLC

(57) ABSTRACT

Methods and apparatus for control of On-Die System Fabric (OSF) blocks are described. In one embodiment, a shadow address corresponding to a physical address may be stored in response to a user-level request and a logic circuitry (e.g., present in an OSF) may determine the physical address from the shadow address. Other embodiments are also disclosed.

20 Claims, 7 Drawing Sheets

(56) References Cited

FOREIGN PATENT DOCUMENTS

| JP | 2006-252554 A | 9/2006 |
|---|---|---|
| JP | 2008-537618 A | 9/2008 |
| KR | 2007-0082229 A | 8/2007 |
| RU | 2245578 C2 | 1/2005 |
| RU | 2004131609 A | 4/2006 |
| WO | 2010/117518 A2 | 10/2010 |
| WO | 2010/117518 A3 | 1/2011 |

OTHER PUBLICATIONS

Schaelicke et al., "Design Trade-Offs for User-Level I/O Architectures", Aug. 2006, IEEE Transactions on Computers, vol. 55, No. 8, pp. 962-973.
Fang et al., "Active Memory Operations", ACM 978-1-59593-768-1/07/0006, ICS'07, Seattle, WA, USA, Jun. 18-20, 2007, pp. 232-241.
Wang et al., "EXOCHI: Architecture and Programming Environment for A Heterogeneous Multi-core Multithreaded System", Microarchitecture Research Lab, Microprocessor Technology Labs, Intel Corporation, PLDI'07, San Diego, California, USA, Jun. 11-13, 2007, pp. 156-166.
International Preliminary Report on Patentability Received for PCT Application No. PCT/US2010/026078, mailed on Oct. 13, 2011, 5 pages.
International Search Report and Written Opinion Received PCT application No. PCT/US2010/026078 mailed on Sep. 30, 2010, 6 pages.
Office Action Received for U.S. Appl. No. 12/415,941, mailed on Dec. 8, 2011, 10 pages.
Notice of Allowance Received for U.S. Appl. No. 12/415,941, mailed on Mar. 29, 2012, 6 pages.
Office Action Received for Chinese Patent Application No. 201010157282.8, mailed on Jan. 18, 2012, 7 pages of Office Action and 12 pages of English Translation.
Office Action Received for Chinese Patent Application No. 201010157282.8, mailed on Oct. 17, 2012, 3 pages of Office Action and 5 pages of English Translation.
Office Action Received for Russian Patent Application No. 2011141892, mailed on Nov. 15, 2012, 5 pages of Office Action and 3 pages of English Translation.
Notice of Allowance Received for Chinese Patent Application No. 201010157282.8, mailed on Feb. 4, 2013, 4 pages of Notice of Allowance and 2 pages of English Translation.
Office Action received for Korean Patent Application No. 2011-7023169, mailed on Apr. 23, 2013, 4 pages of Office Action summary.
Notice of Allowance Received for Russian Patent Application No. 2011141892, mailed on Mar. 25, 2013, 9 pages of Notice of Allowance and 1 page of Foreign Associate's reporting correspondence.

* cited by examiner a) x86 code, without IP blocks, or with ISA extensions:
```
va = malloc(size);
Loop for 1 million iterations
    va = ....;    //calculate the data address on which to perform FFT
    X86_FFT(va, params);    // function call or new instructions
``` b) IP invoked through conventional device driver:
```
va = malloc(size);
Loop for 1 million iterations
    va = ....;
    // trap into kernel to access pagetable:
    syscall_accelerator_FFT(va, params);
``` c) IP invoked using just a store from the user application:
```
va = malloc(size);
va_alias = syscall_OSF_remap(va, size);
Loop for 1 million iterations
    va_alias = ....;
    store params → va_alias;   //ordinary x86 store instruction
```

FIG. 2

| VA | PA | cacheable |
|---|---|---|
| 0x0000a000 | 0x0000f000 | 1 |
| 0x0000b000 | 0x30a07000 | 1 |
| 0x0000c000 | 0x01031000 | 1 |
| 0x0000d000 | 0x2bc09000 | 1 |

(A) On a conventional platform

| VA | PA | cacheable |
|---|---|---|
| 0x0000a000 | 0x0000f000 | 1 |
| 0x0000b000 | 0x30a07000 | 1 |
| 0x0000c000 | 0x01031000 | 1 |
| 0x0000d000 | 0x2bc09000 | 1 |

| alias VA | shadow PA | cacheable |
|---|---|---|
| 0x02003000 | 0x8000f000 | 0 |
| 0x02004000 | 0xb0a07000 | 0 |
| 0x02005000 | 0x81031000 | 0 |
| 0x02006000 | 0xabc09000 | 0 |

⎫ 402

(B) After syscall_OSF_remap

*FIG. 4*

CONTROL OF ON-DIE SYSTEM FABRIC BLOCKS

RELATED APPLICATIONS

This application is a continuation of, and claims priority to, co-pending U.S. application Ser. No. 12/415,941, entitled "CONTROL OF ON-DIE SYSTEM FABRIC BLOCKS", Filed Mar. 31, 2009, issued as U.S. Pat. No. 8,225,069, on Jul. 17, 2012, which is hereby incorporated herein in its entirety and for all purposes.

FIELD

The present disclosure generally relates to the field of electronics. More particularly, an embodiment of the invention relates to techniques for control of On-Die System Fabric (OSF) blocks.

BACKGROUND

In electronic design, a semiconductor Intellectual Property (IP) block (also referred to as "IP core" or "logic core" or more generally a "logic block") is a reusable unit of logic circuitry, cell, or chip layout design. For example, such logic blocks may be used or reused as building blocks in a various chip or logic designs.

As the number of IP blocks increases, their integration into a system becomes more challenging. Also, by design, IP blocks may not include sophisticated circuitry (e.g., to keep costs down). To this end, some tasks associated with address handling may need to be performed by a host processor rather than logic in an IP block. This may cause latency, for example, associated with address handling through frequent switching between user and kernel modes of the host processor.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 2 illustrates user-level code snippets, according to an embodiment.

FIG. 4 illustrates sample entries in an OS page table and TLB, according to some embodiments.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments relate to techniques for control of IP or logic blocks coupled via an On-Die System Fabric (OSF). The control may be asserted at user level in an embodiment. Furthermore, an OSF may interface processor core(s) to IP blocks (such as input/output devices in some embodiments).

IP blocks may generally not include a Memory Management Unit (MMU), e.g., due to costs, so the OSF needs to pass physical addresses to the IP blocks. One way to provide support for address handling is to use in-kernel device drivers for IP blocks. Such device drivers may have the privilege to operate based on physical addresses. However, this model may be inefficient for finer-grained accelerations due to the high cost of frequent switching between user and kernel modes and/or page table walk. A user-level control, however, faces the challenge of how to pass physical addresses to the IP blocks.

To this end, an embodiment utilizes physical address shadowing to handle this challenge. For example, a system call may be implemented in an Operating system (OS) to create a shadow of physical page numbers or addresses (e.g., using the otherwise invalid physical address range), which is also referred to herein as "remap". Further, hardware (e.g., at a location in communication with the OSF) may extract the real physical address from a shadow address (also referred to herein as "remap$^{-1}$"). In an embodiment, the hardware for remap$^{-1}$ may involve flipping or inverting the highest one or two bits of the address. In one embodiment, applications (e.g., executing at user level) may use an ordinary x86 store from user space to pass memory addresses and other parameters to an IP block. This would be an order of magnitude faster than trapping into the kernel to access the page table, and orders of magnitude cheaper than building an extra MMU in an IP block.

Moreover, in some embodiments, user applications may trigger IP block execution with four features: (1) no Instruction Set Architecture (ISA) extensions; (2) no excessive user-kernel mode switching; (3) no extra MMU; and/or (4) processor core and IP blocks may share addresses that are not fixed but only known at run time. Such features may result in a much less restricted usage of the IP blocks. This may also allow for wider deployment of fine-grained accelerators through an OSF.

Figure 1:
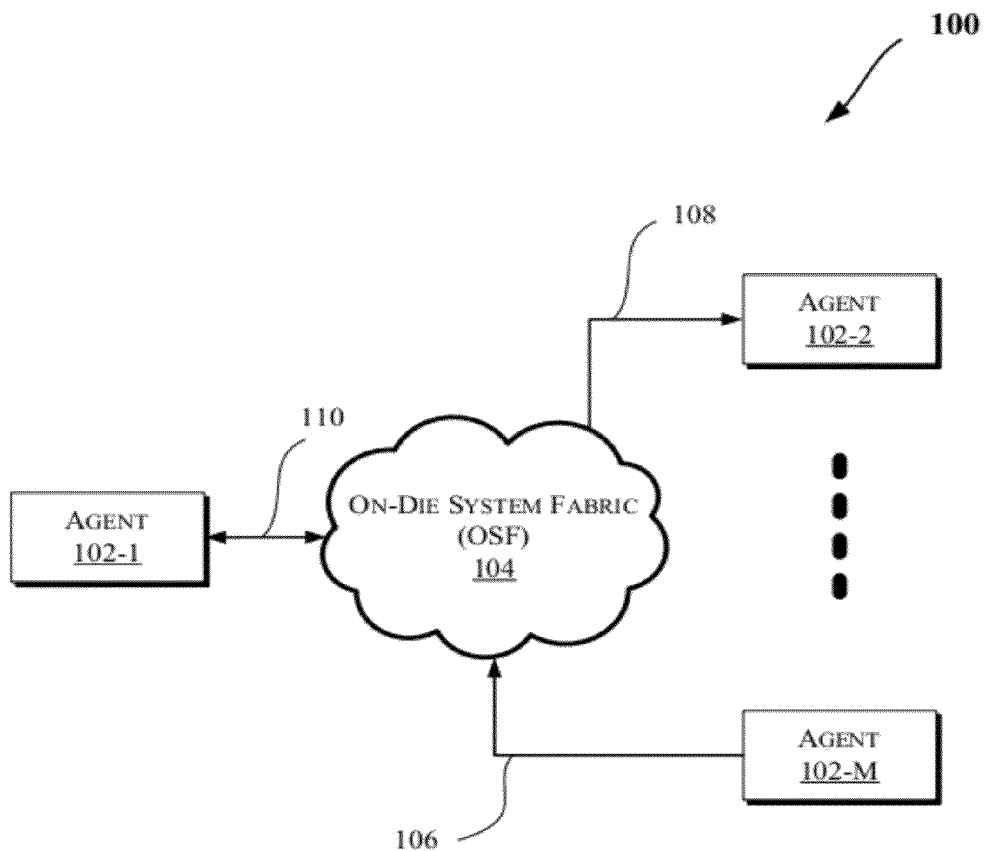
FIGS. 1 and 6-7 illustrate block diagrams of embodiments of computing systems, which may be utilized to implement various embodiments discussed herein.

Techniques discussed herein may be applied in various computing systems, such as those discussed with reference to FIGS. 1, and 6-7. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 6-7.

As illustrated in FIG. 1, the agents 102 may communicate via a fabric 104, such as an OSF. Hence, agents 102 and fabric 104 may be present on the same integrated circuit die in an embodiment. As discussed herein, "OSF" may refer to an On-Die System Fabric which is scalable, configurable, and/or product specific. For example, each of the agents 102 may be a bridge (e.g., for coupling to another fabric), IP block, or another component of an electronic device which are coupled via the fabric 104. In one embodiment, the fabric 104 may include a computer network that allows various agents (such as computing devices) to communicate data. In an embodiment, the fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the fabric 104 may provide communication that adheres to one or more cache coherent protocols. Alternatively, fabric 104 may adhere to non-coherent protocols.

Furthermore, as shown by the direction of arrows in FIG. 1, the agents 102 may transmit and/or receive data via the fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110). In some embodiments, links 106-110 may be OSF interfaces that provide protocol and/or signaling to allow IP blocks to interoperate across multiple designs.

In an embodiment, OSF interfaces that couple the agents 102 (e.g., links 106-110) may provide two ports referred to as primary channel and sideband channel. The primary channel may: (a) be a high performance interface for data transfer between peers and/or upstream; (b) support memory (e.g., 32 bit, 64 bit), input/output (IO), configuration, and message transactions; (c) support Peripheral Component Interconnect (PCI) ordering rules and/or enumeration; (d) support split transaction protocol; and/or (e) maps PCI-e header information. The sideband channel may: (i) provide a standard interface to communicate all sideband information and eliminate special purpose wires; (ii) provide a point-to-point network; (iii) be used for status, power management, configuration shadowing, test modes, etc.; and/or (iv) be used for low performance (e.g., not intended for primary data transfers).

FIG. 2 illustrates user-level code snippets for Fast Fourier Transform (FFT) with and without OSF-attached IP blocks, according to some embodiments. Portion c) is enabled by an embodiment of the invention as further discussed herein.

In-kernel device drivers, IP blocks may communicate with a processor core through a packet-based interconnect such as an OSF. IP blocks may be controlled by device drivers of an OS. In special cases such as Network Interface Card (NIC) driver, memory buffers may be fixed such that the task of passing a start address to the driver is moot. In some embodiments, a more general usage case is addressed, e.g., where each time a function is invoked on an IP block, the "buffer" address changes. In order to invoke execution on an IP block starting from an arbitrary user-space virtual address (VA), the user application may make a system call, which traps into the kernel and triggers the device driver (see, e.g., FIG. 2b)). The device driver (such as the device driver of FIG. 6) obtains the physical address (PA), by looking it up in the page table in memory (and not by using Translation Lookaside Buffer (TLB)). It then passes the PA to the IP block. However, frequent user-kernel mode switching and the page table walk could easily take thousands of processor clocks, severely offsetting the performance benefit of acceleration in IP blocks. Furthermore, some user-level device drivers for IO devices may either constrain the application and kernel to share some pre-allocated, fixed memory buffer or require an extra MMU in the memory system to translate application virtual addresses to physical addresses.

Referring to FIG. 2, portion c) shows a programming model that is provided in accordance with one embodiment. For example, an application makes one system call after malloc( ). Thereafter, it will be able to pass data addresses to IP blocks using ordinary (e.g., x86) store instructions to user space virtual addresses (va_alias in FIG. 2). Next figure will show an example of how an IP block may receive the physical memory addresses that support the application virtual addresses.

Figure 3:
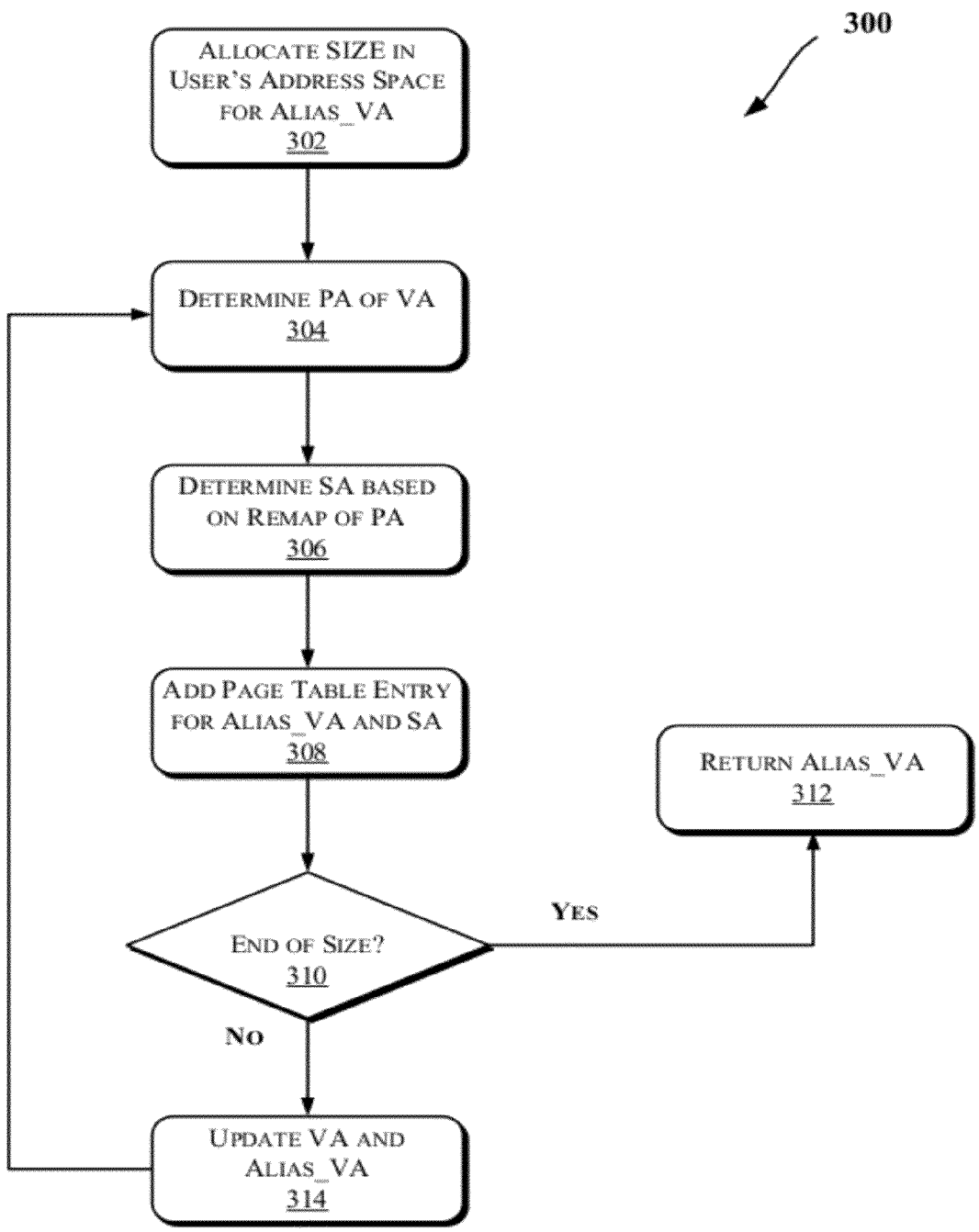
FIGS. 3 and 5 illustrate flow diagrams of methods, according to some embodiments.

More specifically, FIG. 3 illustrates a flow diagram of a method 300 to perform a remap operation, according to an embodiment. The remap operation may be implemented as a system call in the OS to create a shadow of physical page numbers or physical addresses, e.g., using an otherwise invalid or unused physical address range. In one embodiment, the data or command communications discussed with reference to method 300 may be performed through the primary channel discussed with reference to FIG. 1.

In an embodiment, after performance of the remap of FIG. 3, a remap$^{-1}$ operation may use hardware in OSF that extracts the real physical address from a shadow address. In one embodiment, the remap$^{-1}$ operation may be implemented by flipping one or two of the highest bits of the address (or more than two bit in some embodiments).

In some embodiments, the remap$^{-1}$ operation, the shadow-to-real physical conversion, may be performed wherever a physical address is used, such as in the system interconnect or inside the IP blocks. Performing this operation in the system interconnect may have put this operation on the critical path of memory transactions that are not intended to IP blocks in some situations. Performing this operation inside the accelerators may require that the remap$^{-1}$ logic be built into every IP block. Alternatively, such hardware may be provided in the OSF. With such support, applications may use a single X86 store instruction to designate a memory address for the IP block to use.

Referring to FIGS. 1-3, at an operation 302, a number of bytes (e.g., "size" in FIG. 2c)) may be allocated in a user's address space for an alias of VA (Alias_VA, also referred to herein interchangeably as "VA_Alias"). At an operation 304, the PA for the VA may be determined. At an operation 306, SA (Shadow Address) may be determined based on PA. For example, at operation 306, Remap_to_shadow( ) may provide a mapping that has a simple reverse function so that OSF may extract the true physical address easily. In some systems the actual installed memory is less than half of the physical address space. On such a machine, the Remap( ) and Remap$^{-1}$( ) functions may both be implemented by flipping the highest one or two bits of the address. For example, where:

Remap (PA)=0x80000000 XOR PA
Remap$^{-1}$(SA)=0x80000000 XOR SA

In some embodiments, non-accelerated portions of an application may continue to use the original VA. Further, syscall_OSF_remap( ) may be performed only once after malloc( ), e.g., at application initialization phase (see, e.g., FIG. 2c)).

In an embodiment, Remap$^{-1}$(SA) may be performed by OSF hardware at every invocation of an IP block function. In an embodiment, the OS needs to keep the shadow page table consistent with the original one.

At operation 308, a page table entry for Alias_VA and SA may be added. In one embodiment, a page attribute of the entry may be set to uncacheable (such as discussed with reference to FIG. 4) at operation 308. At an operation 310, if the end of the allocated size of operation 302 is reached, the Alias_VA may be returned; otherwise, VA and Alias_VA may be updated (e.g., VA and Alias_VA may be incremented by a select page size) at operation 314. After operation 314, method 300 resumes with operation 304.

FIG. 4 illustrates sample entries in the OS page table and TLB, according to some embodiments. For example, 0x0200400 is a user virtual address allocated by syscall_OSF_remap( ). As an alias to VA 0x0000b000, it is backed by physical page 0x30a07000. But in the page table, we intentionally flipped the highest bit so the physical page became 0xb0a07000 (0x80000000 XOR 0x30a07000=0xb0a07000). In an embodiment, the TLB and TLB miss handler do not care whether a PA is a shadow or not.

As shown in FIG. 4, the address mappings are changed for the calling application as a result of making the system call. In this example, any PA that is higher than 0x40000000 is invalid in the baseline platform. The alias virtual addresses are all mapped to the invalid region of the physical address space 402. Valid PA range in both systems: 0x0~0x40000000 (including installed memory and Memory Mapped IO (MMIO)).

Figure 5:
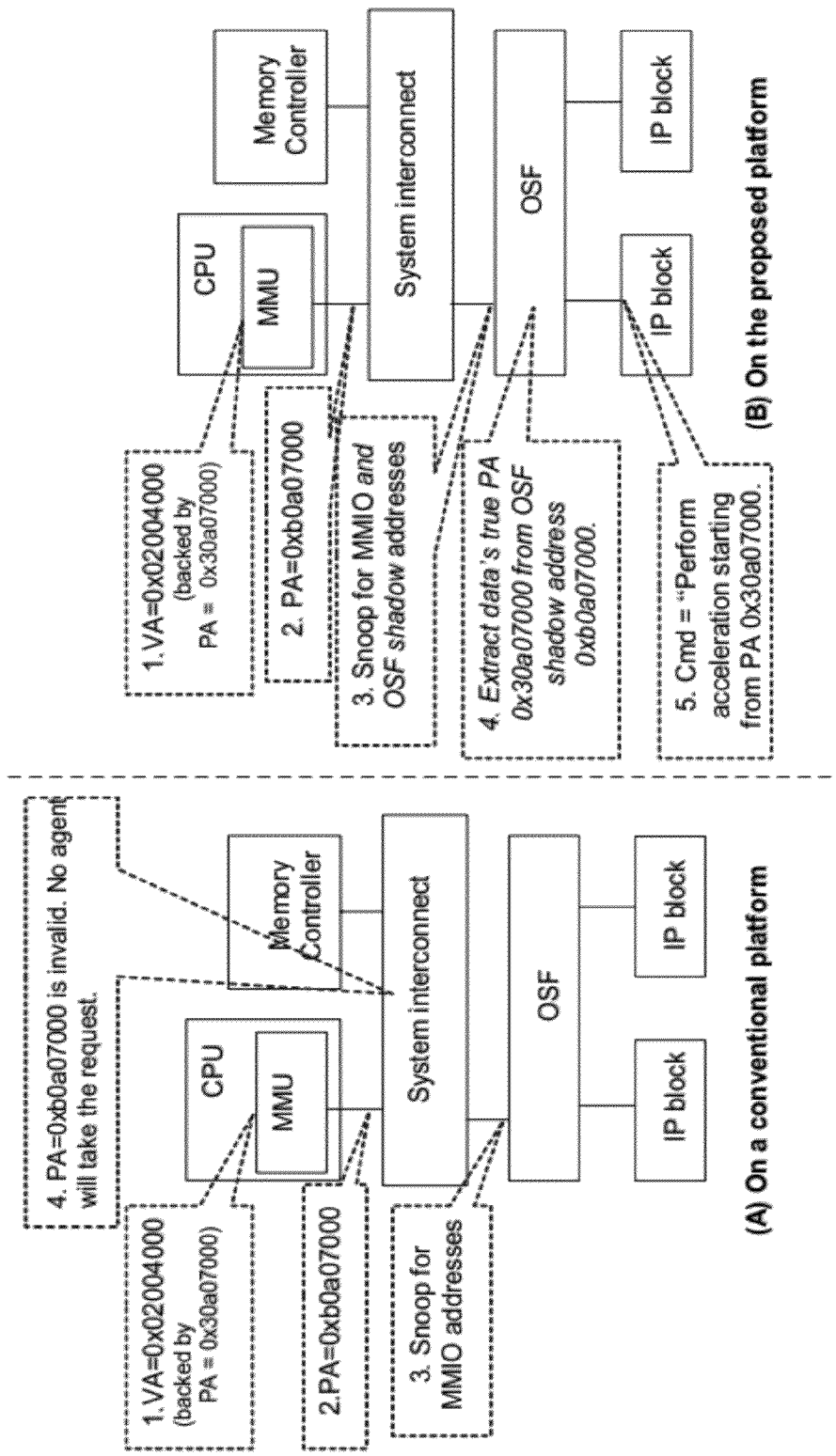

FIG. 5 illustrates a comparison of when an application executes an X86 store instruction "st register→0x02004000" on a platform with and without the special logic in OSF (portions (B) and (A) of FIG. 5, respectively). In both cases, the processor (CPU) MMU translates the VA to PA 0xb0a07000 based on the page table shown in FIG. 4(B). Because the attribute bit of the page indicates uncacheable, the write bypasses the processor caches and directly reaches the system interconnect (operation 2 in FIG. 5).

In FIG. 5(A), since the PA is beyond the valid PA address range (e.g., where the valid PA range is: 0x0~0x40000000 (including installed memory and MMIO)), the hardware raises an exception. In FIG. 5(B), OSF picks up the otherwise invalid physical address 0xb0a07000 (operation 3), performs Remap$^{-1}$ on it (operation 4), and converts the write transaction into a command packet from which the IP block will get the true physical address 0x30a07000 (operation 5).

Various types of computing systems may be used to implement the embodiments discussed herein (such as those discussed with reference to FIGS. 1-5). For example, FIG. 6 illustrates a block diagram of an embodiment of a computing system 600. One or more of the agents 102 of FIG. 1 may comprise one or more components of the computing system 600. The computing system 600 may include one or more central processing unit(s) (CPUs) 602 (which may be collectively referred to herein as "processors 602" or more generically "processor 602") coupled to an interconnection network (or bus) 604. The processors 602 may be any type of processor such as a general purpose processor, a network processor (which may process data communicated over a computer network 605), etc. (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

The processor 602 may include one or more caches and/or Memory Management Units (MMUs, such as discussed with reference to FIGS. 1-5) (not shown). The caches may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 600.

Figure 6:
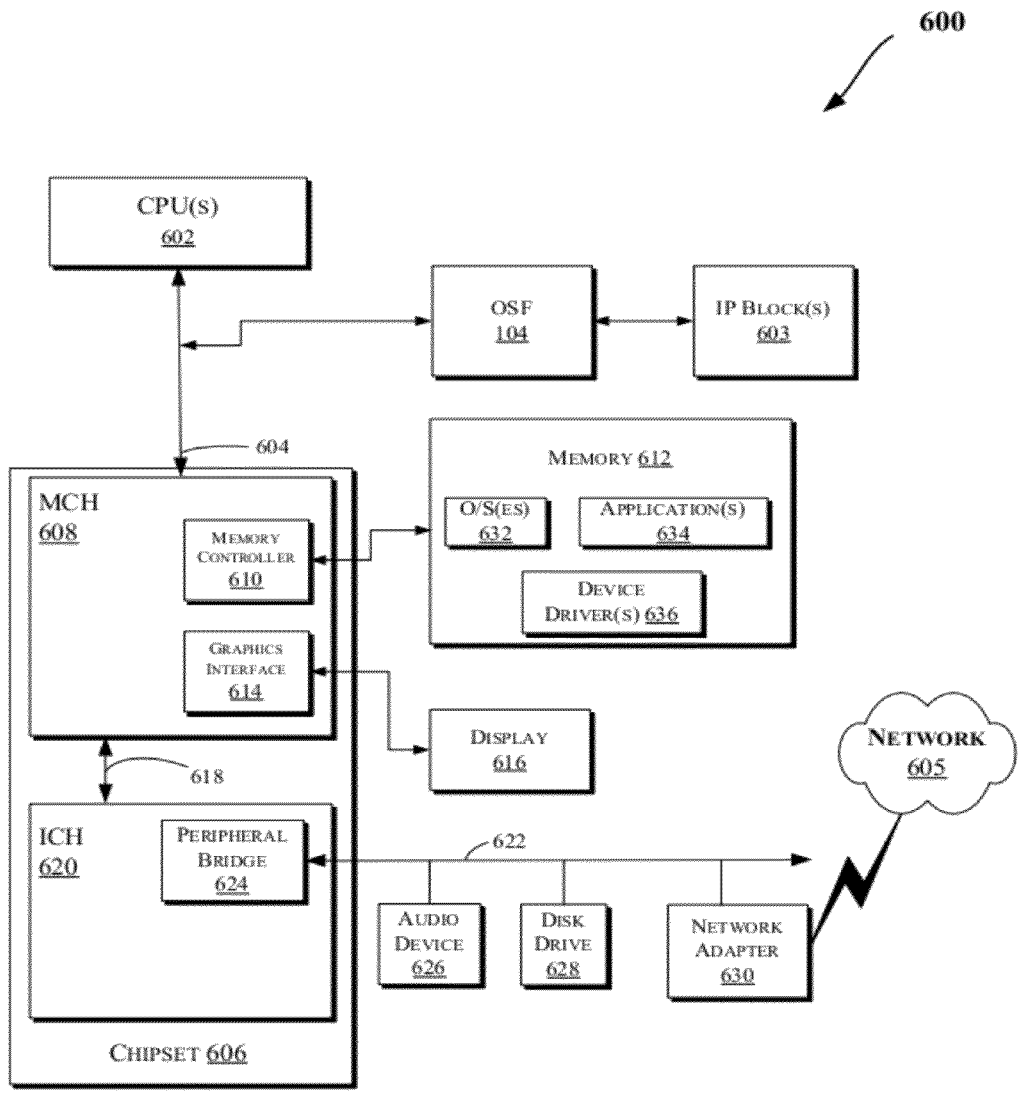

As shown in FIG. 6, the OSF 104 may be coupled between one or more IP blocks 603 and the processor(s) 602 (e.g., through the interconnect 604). As discussed with reference to FIGS. 1-5, the OSF 104 may include logic to perform a remap$^{-1}$ operation.

A chipset 606 may additionally be coupled to the interconnection network 604. Further, the chipset 606 may include a memory control hub (MCH) 608. The MCH 608 may include a memory controller 610 that is coupled to a memory 612. The memory 612 may store data, e.g., including sequences of instructions that are executed by the processor 602, or any other device in communication with components of the computing system 600. In an embodiment, the memory 612 may be used to store data such as discussed with reference to FIGS. 1-5 (such as a page table). Also, in one embodiment of the invention, the memory 612 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 604, such as multiple processors and/or multiple system memories.

The MCH 608 may further include a graphics interface 614 coupled to a display device 616 (e.g., via a graphics accelerator in an embodiment). In one embodiment, the graphics interface 614 may be coupled to the display device 616 via an accelerated graphics port (AGP). In an embodiment of the invention, the display device 616 (such as a flat panel display) may be coupled to the graphics interface 614 through, for example, a signal converter that translates a digital representation of an image stored in a storage device such as video memory or system memory (e.g., memory 612) into display signals that are interpreted and displayed by the display 616.

As shown in FIG. 6, a hub interface 618 may couple the MCH 608 to an input/output control hub (ICH) 620. The ICH 620 may provide an interface to input/output (I/O or IO) devices coupled to the computing system 600. The ICH 620 may be coupled to a bus 622 through a peripheral bridge (or controller) 624, such as a peripheral component interconnect (PCI) bridge that may be compliant with the PCIe specification, a universal serial bus (USB) controller, etc. The bridge 624 may provide a data path between the processor 602 and peripheral devices. Other types of topologies may be utilized. Also, multiple buses may be coupled to the ICH 620, e.g., through multiple bridges or controllers. For example, the bus 622 may comply with the PCI Local Bus Specification, Revision 3.0, 2004, available from the PCI Special Interest Group, Portland, Oreg., U.S.A. (hereinafter referred to as a "PCI bus"). Alternatively, the bus 622 may comprise a bus that complies with the PCI-X Specification Rev. 3.0a, 2003 (hereinafter referred to as a "PCI-X bus") and/or PCI Express (PCIe) Specifications (PCIe Specification, Revision 2.0, 2006), available from the aforementioned PCI Special Interest Group, Portland, Oreg., U.S.A. Further, the bus 622 may comprise other types and configurations of bus systems. Moreover, other peripherals coupled to the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 622 may be coupled to an audio device 626, one or more disk drive(s) 628, and a network adapter 630 (which may be a NIC in an embodiment). In one embodiment, the network adapter 630 or other devices coupled to the bus 622 may communicate with the chipset 606 via the switching logic 612 (which may be the same or similar to the logic 412 of FIG. 4 in some embodiments). Other devices may be coupled to the bus 622. Also, various components (such as the network adapter 630) may be coupled to the MCH 608 in some embodiments of the invention. In addition, the processor 602 and the MCH 608 may be combined to form a single chip.

Additionally, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 612 may include one or more of the following in an embodiment: an operating system (O/S) 632, application 634, and/or device driver 636 (such as the OS, application(s), and/or device drivers discussed with reference to FIGS. 1-5). The memory 612 may also include regions dedicated to MMIO operations. Programs and/or data stored in the memory 612 may be swapped into the disk drive 628 as part of memory management operations. The application(s) 634 may execute (e.g., on the processor(s) 602) to communicate one or more packets with one or more computing devices coupled to the network 605. In an embodiment, a packet may be a sequence of one or more symbols and/or values that may be encoded by one or more electrical signals transmitted from at least one sender to at least on receiver (e.g., over a network such as the network 605). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 605).

In an embodiment, the application 634 may utilize the O/S 632 to communicate with various components of the system 600, e.g., through the device driver 636. Hence, the device driver 636 may include network adapter (530) specific commands to provide a communication interface between the O/S 632 and the network adapter 630, or other I/O devices coupled to the system 600, e.g., via the chipset 606.

In an embodiment, the O/S 632 may include a network protocol stack. A protocol stack generally refers to a set of procedures or programs that may be executed to process packets sent over a network (605), where the packets may conform to a specified protocol. For example, TCP/IP (Transport Control Protocol/Internet Protocol) packets may be processed using a TCP/IP stack. The device driver 636 may indicate the buffers 638 that are to be processed, e.g., via the protocol stack.

The network 605 may include any type of computer network. The network adapter 630 may further include a direct memory access (DMA) engine 652, which writes packets to buffers (e.g., stored in the memory 612) assigned to available descriptors (e.g., stored in the memory 612) to transmit and/or receive data over the network 605.

Figure 7:
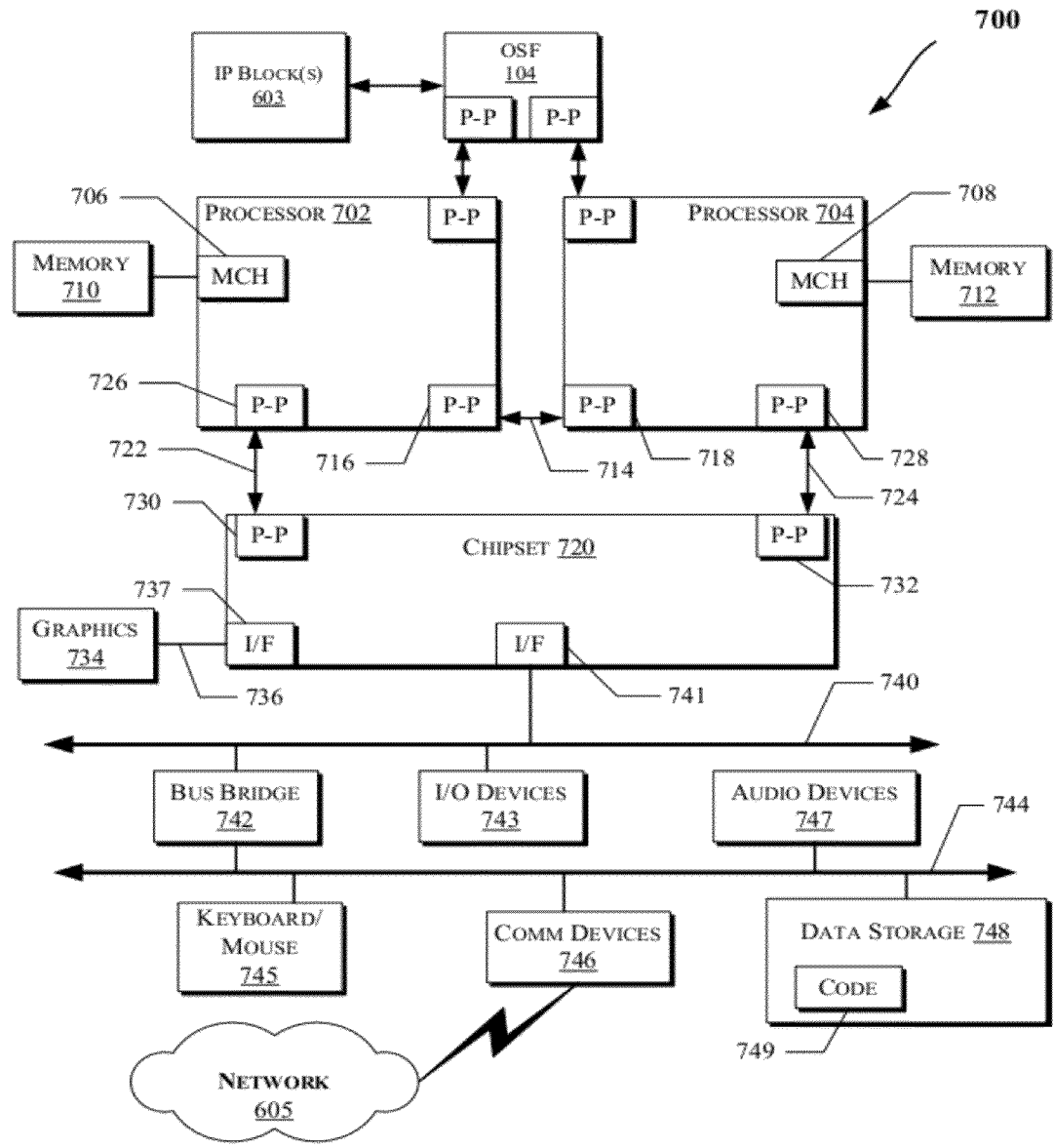

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712 (which may store MMIO regions such as discussed with reference to claims 2-3). The memories 710 and/or 712 may store various data such as those discussed with reference to the memory 612 of FIG. 6. As shown in FIG. 7, the processors 702 and 704 may also include one or more cache(s) such as those discussed with reference to FIGS. 4 and 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, the OSF 104 may couple the processors 702, 704 (through PtP interfaces, for example) to one or more IP blocks 603. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7. Also, processor(s) 702, 704 may include MMU(s) (such as discussed with reference to FIG. 5). Further, OSF 104 may include remap$^{-1}$ logic or the logic may be located elsewhere in system 700, such as within chipset 720, communication device(s) 746, devices coupled to bus 740/744, etc.

The chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 605), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
an On-die System Fabric (OSF) to couple a processor to a logic block;
and memory to store a shadow address corresponding to a physical address in response to a user-level request, wherein a system call implemented in an Operating system (OS) is to generate the shadow address which uses an otherwise invalid or unused physical address range,
wherein the OSF is to comprise logic to determine the physical address from the shadow address based on an inverted portion of the shadow address and wherein an application executing at a user level is to utilize a store operation to pass a memory address to the logic block.

2. The apparatus of claim 1, wherein the memory is to store a virtual address corresponding to the physical address and an alias virtual address corresponding to the shadow address.

3. The apparatus of claim 2, wherein the memory is to store a page table, wherein the page table is to comprise an entry corresponding to the alias virtual address and the shadow address.

4. The apparatus of claim 1, wherein the memory is to store cacheable indications for the shadow address and the physical address.

5. The apparatus of claim 1, wherein the processor and the logic block share addresses that are only known at run time.

6. The apparatus of claim 1, wherein the processor and the logic block share addresses that are not fixed and are only known at run time.

7. The apparatus of claim 1, wherein the memory is to store an application to generate the user-level request.

8. The apparatus of claim 1, wherein the memory is to store an application to generate a store operation that passes memory addresses or other parameters to the logic block.

9. The apparatus of claim 1, wherein the OSF and the memory are on a same integrated circuit die.

10. The apparatus of claim 1, wherein the processor is to comprise a plurality of processors that communicate with the logic block via the OSF.

11. The apparatus of claim 10, wherein the plurality of processor cores, the memory, and the OSF are on a same integrated circuit die.

12. The apparatus of claim 1, further comprising a first interface to couple the OSF to the processor and a second interface to couple the OSF to the logic block, wherein the first interface and the second interface each comprise a primary channel and a sideband channel and wherein the logic block and the processor are to communicate through the primary channels of the first and second interfaces.

13. A method comprising:
in response to a user-level request, allocating a portion of a memory for storage of a shadow address corresponding to a physical address, wherein a system call implemented in an Operating system (OS) generates the shadow address which uses an otherwise invalid or unused physical address range; and
determining, at an On-die System Fabric (OSF), the physical address from the shadow address based on an inverted portion of the shadow address, wherein an application executing at a user level is to utilize a store operation to pass a memory address to the logic block.

14. The method of claim 13, further comprising storing a virtual address corresponding to the physical address and an alias virtual address corresponding to the shadow address in the memory.

15. The method of claim 14, further comprising storing a page table in the memory, wherein the page table is to comprise an entry corresponding to the alias virtual address and the shadow address.

16. The method of claim 13, wherein allocating the portion of the memory comprises allocating an invalid physical address range.

17. The method of claim 13, further comprising storing cacheable indications for the shadow address and the physical address in the memory.

18. The method of claim 13, further comprising:
storing an application in the memory; and
the application generating the user-level request.

19. The method of claim 13, further comprising:
storing an application in the memory; and
the application generating a store operation that passes memory addresses or other parameters to a logic block.

20. The method of claim 19, further comprising coupling a processor to the logic block via the OSF.

* * * * *